(12) United States Patent
Alzner

(10) Patent No.: US 7,988,134 B2
(45) Date of Patent: Aug. 2, 2011

(54) TRANSFER TRAYS FOR MASS TRANSFER COLUMNS IN OFFSHORE USE

(75) Inventor: Gerhard Alzner, München (DE)

(73) Assignee: Linde Aktiengesellschaft, Munich (DE)

( * ) Notice: Subject to any disclaimer, the term of this patent is extended or adjusted under 35 U.S.C. 154(b) by 457 days.

(21) Appl. No.: 12/182,589

(22) Filed: Jul. 30, 2008

(65) Prior Publication Data
US 2009/0032980 A1 Feb. 5, 2009

(30) Foreign Application Priority Data

Aug. 2, 2007 (DE) .......................... 10 2007 036 180

(51) Int. Cl.
*B01F 3/04* (2006.01)
(52) U.S. Cl. ............. 261/114.1; 202/158; 203/DIG. 24; 261/114.2
(58) Field of Classification Search ............... 261/114.1, 261/114.2, 114.5, 114.3, 114.4; 203/DIG. 24; 202/158
See application file for complete search history.

(56) References Cited

U.S. PATENT DOCUMENTS

| | | | | |
|---|---|---|---|---|
| 2,210,808 A * | 8/1940 | Glitsch | | 261/114.2 |
| 2,366,958 A * | 1/1945 | Dennis | | 261/114.2 |
| 2,378,157 A * | 6/1945 | Ramseyer et al. | | 34/588 |
| 2,545,691 A * | 3/1951 | Gerhold | | 261/114.2 |
| 3,062,517 A * | 11/1962 | Voetter et al. | | 261/114.3 |
| 3,434,701 A * | 3/1969 | Bauer | | 261/114.1 |
| 4,311,564 A * | 1/1982 | Aldridge | | 203/99 |
| 4,578,153 A * | 3/1986 | Newton | | 203/99 |
| 4,603,022 A * | 7/1986 | Yoneda et al. | | 261/114.2 |
| 5,098,615 A * | 3/1992 | Resetarits | | 261/114.1 |
| 6,293,528 B1 * | 9/2001 | Monkelbaan et al. | | 261/114.1 |
| 2006/0169573 A1 * | 8/2006 | Lee et al. | | 202/158 |

FOREIGN PATENT DOCUMENTS

DE 10 2005 044 224 3/2007
JP 55-1835 A * 1/1980

* cited by examiner

*Primary Examiner* — Richard L Chiesa
(74) *Attorney, Agent, or Firm* — Millen, White, Zelano & Branigan, P.C.

(57) ABSTRACT

The invention describes a mass transfer column with at least one transfer tray via which liquid is routed in essentially the horizontal direction and through which gas is routed in the vertical direction. The transfer tray is designed as a reverse flow tray and a first separating weir (4) for changing the flow direction of the liquid flowing over the transfer tray by at least 90°, especially by roughly 180°. The transfer tray (2) is equipped with riser neck caps (3), at least one guide weir (5) for routing the liquid flow, and at least one braking weir (6) for reducing the flow velocity. The transfer tray (2) is divided into sections (7) by the separating weir (4), guide weirs (5), braking weirs (6), and column wall. The use of the riser neck caps (3) and weirs (4, 5, 6) with the resulting division of the transfer tray (2) into sections (7) ensures an almost uniform distribution of the liquid regardless of the tilt of the mass transfer column (1). The described mass transfer column (1) is thus suitable especially for use under offshore conditions.

18 Claims, 2 Drawing Sheets

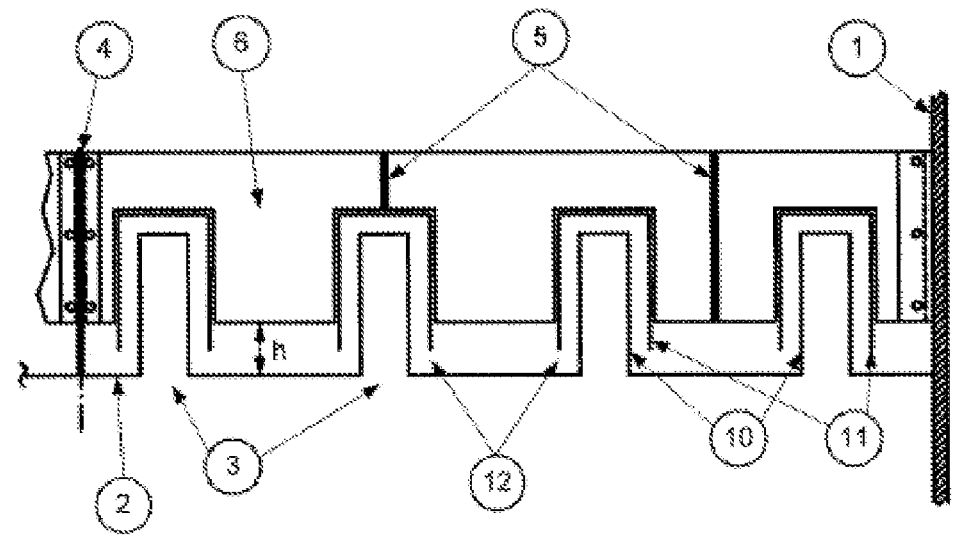
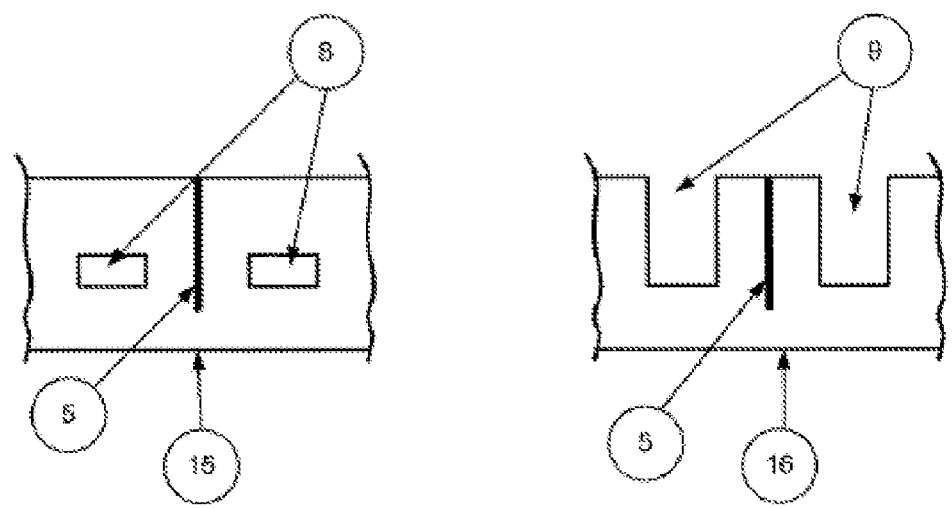

TRANSFER TRAYS FOR MASS TRANSFER COLUMNS IN OFFSHORE USE

The invention relates to a mass transfer column with at least one transfer tray via which liquid is routed in essentially the horizontal direction and through which gas is routed in the vertical direction, the transfer tray being designed as a reverse flow tray and having a first means (separating weir) for changing the flow direction of the liquid flowing over the transfer tray by at least 90°, especially by roughly 180°, and use of the mass transfer column.

In mass transfer columns, rising gas is brought into direct contact with the liquid flowing down in counterflow in order, for example, to carry out distillation or scrubbing processes. This invention relates to mass transfer columns that have a plurality of transfer trays or plates located horizontally on top of one another. Transfer trays are, e.g., known from K. Hoppe, M. Mittelstrass "Principles of Dimensioning of Column Trays," *Technische Fortschrittsberichte [Technical Progress Reports]*, Vol. 61 (1967).

Liquid flows from a feed shaft from overhead onto the tray surface, flows essentially in the horizontal direction over the tray surface, and then floors downward via a downcomer. The static height of the liquid on the tray is determined, among others, by an exit weir located in front of the downcomer. Via openings in the base surface of the transfer tray, gas enters the transversely flowing liquid and flows through it in bubble form. In this way, the desired direct contact is produced between the liquid and the gas.

In certain applications, for example in backwashing trays at the head of scrubbing columns and their regeneration columns, only very little liquid is available. In this case, in the corresponding columns or column sections, reverse flow trays are used, as they are described in, for example, DE 102005044224 as prior art. The feed and drain of the trays lie on the same side. In the middle of the transfer tray is a vertical partition that is open on one side and that induces flow deflection of the liquid by roughly 180°. Such a partition in interaction with the column wall forms a "means for changing the flow direction of liquid flowing over the base surface."

Such a flow reversal compared to normal single-flow trays increases the flow velocity of the liquid and improves flow routing and thus the efficiency of the tray. Especially for large column diameters, however, uniform liquid overflow becomes more difficult. An improvement of liquid overflow is achieved in DE 102005044224 by at least one second partition being located on the transfer tray, which is not directly connected to the first partition. The second partition is located, for example, parallel or offset to the first partition, by which a second flow deflection or flow reversal is induced. In this way, the liquid distribution over the base surface of the tray becomes more uniform, the liquid-side remixing is reduced, and dead spaces through which flow is poor are avoided so that the amount of liquid can be partially reduced. For backwashing processes, for example, a smaller amount of backwash water can be used. The cost for preparing and disposing of the backwash water is accordingly less.

The use of such mass transfer columns becomes a problem under offshore conditions, such as, for example, aboard ship. Under offshore conditions, as prevail for example aboard ship, the tilt of the mass transfer column relative to the vertical changes continuously, for example due to wave motion. The liquid on the transfer tray would thus collect on one side or flow away from the other side, following gravity. In addition, when the angle of tilt changes relative to the vertical, horizontal accelerations also arise in the liquid, by which surge movements are induced in the liquid. Under such conditions, a continuous non-uniform distribution of the liquid arises in transfer trays according to the prior art. In this way, however, the effectiveness of the column is lost, since in places, too little liquid relative to the amount of gas flows in counterflow through the column, or gas and liquid are routed past one another without transfer.

Therefore, the object of this invention is to make a mass transfer column with at least one transfer tray such that almost uniform distribution of the liquid over the transfer tray and thus the serviceability of the mass transfer column are ensured even at an existing or continuously changing tilt of the mass transfer column relative to the vertical.

This object is achieved in that the transfer tray has at least one other means for routing the liquid flow (guide weir) and at least one other means for reducing the flow velocity (braking weir), the transfer tray being divided into sections by the separating weir, guide weir(s) and/or braking weir(s).

The problems of mass transfer columns with transfer trays when using these columns under offshore conditions are caused mainly by the afterflow of the liquid with gravity as a result of the tilt of the columns relative to the vertical. The basic idea of the invention is to prevent or delay this afterflow such that an almost uniform distribution of the liquid over the entire transfer tray is achieved. This is achieved by using the guide and braking weir(s) according to the invention and the associated division of the transfer tray into sections according to the invention.

A means for guiding the liquid flow that is called a guide weir for the purposes of the invention is defined as vertical walls to guide or route the flow of the liquid on the transfer tray from the liquid inlet to the liquid outlet. The means for reducing the flow velocity that is called a braking weir is defined as vertical walls that in interaction with the other weirs and walls of the mass transfer column are used to reduce the flow velocity or the horizontal acceleration of the liquid on the transfer tray. This can be, for example, vertical walls transversely to the flow direction.

The liquid is not only routed from the inlet to the outlet by the separating weir and the guide weirs according to the invention, but also transverse flow is prevented or slowed, as would be induced by tilting of the mass transfer column relative to the vertical. The interaction of the separating weir with the guide weirs and braking weirs according to the invention divides the transfer tray into sections. The weirs according to the invention keep the liquid much longer in the sections even when the mass transfer column is tilted relative to the vertical. Free outflow from the sections as a result of gravity during tilting and the associated high-speed afterflow of the liquid to one side according to the column tilt are thus prevented, so that an almost uniform distribution of the liquid over the entire transfer tray is achieved.

Advantageously, each section is completely bordered by at least one separating, guide, or braking weir and/or the wall of the mass transfer column. The complete delineation of the sections prevents the liquid from flowing out of the section in any direction, induced by the tilt. A uniform distribution of the liquid is ensured.

In a suitable way, the liquid flows under the guide and braking weirs and/or the guide and braking weirs have segments that are at least partially permeable to the liquid. To ensure continued transport of the liquid from tray to tray and to achieve a transfer between the individual sections after the tilt changes, it must be possible for the liquid partially to pass the guide and braking weirs. In one configuration of the invention, the guide and braking weirs are attached at a given height over the transfer tray to the column wall and connected below one another. The liquid can thus flow through under the guide and braking weirs from one section into the next. Free flow is, however, prevented by the weirs. In this case, the liquid level in one section remains distinctly over the installation height of the guide and braking weirs. In another configuration of the invention, the guide and braking weirs have segments that are at least partially permeable to the liquid. This can be achieved, for example, by making recesses in the form of openings or indentations.

Preferably, the transfer tray has riser neck caps for vertical routing-through of the gas, the riser neck and riser caps being dimensioned such that the gas outlet slot that is formed by the gap between the transfer tray and the lower edge of the riser cap, even when the mass transfer column is tilted relative to the vertical, is always underneath the liquid level on the transfer tray. The gas is therefore preferably routed via the riser neck caps through the transfer tray. A riser neck cap consists of the riser neck and an overlying riser cap. The gas flows from underneath through the riser neck against the riser cap that has been seated on the riser neck at a certain distance, is deflected there by roughly 180°, and emerges through the gas outlet slot into the liquid. The riser neck and riser cap are dimensioned such that this gas outlet slot is always underneath the liquid level on the transfer tray. This ensures that the gas, regardless of the tilt of the mass transfer column, enters the liquid and forcefully flows through it. The desired direct mass transfer between the gas phase and liquid is thus ensured.

Especially preferably, the gas outlet slot is located underneath the guide and/or braking weirs under which flow takes place. In one configuration of the invention, the guide and braking weirs are attached to the mass transfer column at a certain height over the transfer tray. The gas outlet slot in this configuration is beneath this height. The liquid accumulates on the weirs and flows under them. By positioning the gas outlet slot beneath the installation height of the weirs, liquid flows permanently around the riser neck caps, and thus it is ensured in this configuration of the invention that the gaseous phase always emerges into the liquid and bubbles through it. The riser neck caps around which the liquid flows additionally counteract gushing movements of the liquid.

In another configuration of the invention, the entry and/or exit weir have segments that are at least partially permeable to the liquid. In this configuration of the invention, the entry and exit weirs are permeable to the liquid so that uniform distribution of the entire liquid flow onto the sections is achieved. This can be done by, for example, making an opening or a gap in the entry and/or exit weir on each section.

The mass transfer column according to the invention is especially preferably operated in offshore operation on a floating carrier system. When using the mass transfer column according to the invention aboard ship, it is advantageously set up such that the separating weir is aligned along the longitudinal axis of the ship. In this use of the mass transfer column, the flow of liquid is routed through the guide weirs once in and once against the longitudinal axis of the ship. Transverse flow of the liquid caused by the tilt of the ship is thus effectively prevented by the guide weirs.

This invention in particular makes it possible to ensure a uniform distribution of the liquid over the entire area of the transfer tray even for various tilts of the mass transfer column relative to the vertical, as occur in offshore operation. Surge movements of the liquid are stopped by the invention. Operation of the column is thus also ensured under adverse conditions.

BRIEF DESCRIPTION OF DRAWINGS

The invention will be explained in more detail below using the embodiment shown in the Figures wherein:

FIG. 2 shows a side view of a braking weir along line AA', FIG. 3 shows a side view of one configuration of the entry and exit weir.

FIG. 1 shows one configuration of the mass transfer column (1) according to the invention; the liquid is routed (13) from the next higher transfer tray to the illustrated transfer tray (2) and leaves the illustrated transfer tray (2) via the downcomer (14) to the next underlying transfer tray. The gas flows through the transfer tray (2) through a plurality of riser neck caps (3). The transfer tray (2) is made as a reverse flow tray. The flow direction of the liquid is deflected from the inlet (13) to the downcomer (14) by the separating weir (4) by roughly 180°. The flow of liquid is routed by the guide weirs (5) from the inlet (13) to the downcomer (14). Transversely to the guided flow of liquid, there are numerous braking weirs (6) that divide the transfer tray (2) into several sections (7) in combination with the guide weirs (5), the separating weir (4), and the wall of the mass transfer column (1). Outflow of the liquid from these sections (7) that is induced by the tilt of the column relative to the vertical is delayed by the use of the weirs (5, 6) according to the invention, by which an almost uniform distribution of the liquid over the entire transfer tray (2) is ensured.

FIG. 2 shows a side view of a braking weir (6) with several riser neck caps (3) along line A A'. The illustrated weir is attached to the wall of the mass transfer column at a certain height (h) over the transfer tray (2). The gas emerges from underneath into the riser neck (10), is deflected by the riser cap (11) by roughly 180° and via the gas outlet slot (12) enters the liquid, bubbles through it, and thus provides for direct mass transfer. The gas outlet slot (12) is located beneath the height (h) of the weirs in this configuration of the invention.

FIG. 3 shows a side view of one configuration of the entry weir (15) and exit weir (16). The entry weir (15) or exit weir (16) is at least partially permeable to the liquid. In the configuration, the passages (8, 9) for the liquid are positioned such that the liquid is uniformly divided in the sections located behind.

Figure 1:
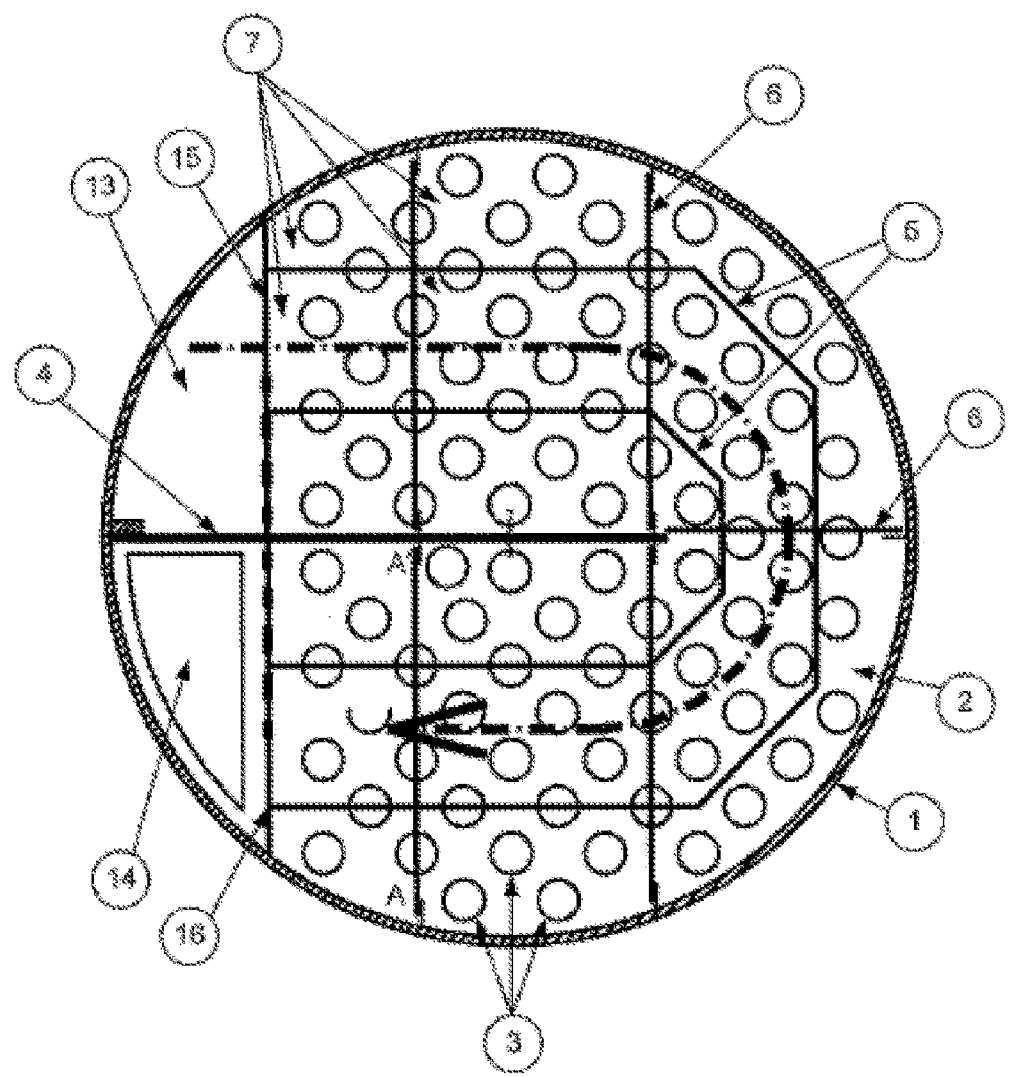
FIG. 1 shows a transfer tray of one configuration of the invention in a top view.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding German application No. 10 2007 036 180.9, filed Aug. 2, 2007, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A mass transfer column (1) comprising:
a column wall and at least one transfer tray (2) for routing liquid in an essentially horizontal direction, said tray comprising a plurality of riser necks and riser caps (3) through which gas is routed in a vertical direction, said transfer tray being a reverse flow tray comprising a liquid inlet and a liquid outlet, and a first separating weir (4) for changing the flow direction of liquid flowing over said at least one transfer tray by at least 90° from said liquid inlet to said liquid outlet said transfer tray (2) further comprising at least one guide weir (5), said guide weir comprising vertical wall sections for routing liquid flow from said liquid inlet, around said separating weir, and to said liquid outlet, and at least one braking weir (6) for reducing the flow velocity, said at least one braking weir (6) being traverse to said at least one guide weir (5), said transfer tray (2) being divided into tray sections (7), each section being defined by said at least one braking weir (6) and (a) two of the guide weirs (5), (b) said at least one guide weir and said separating weir (4), or (c) said at least one guide weir and said column wall.

2. A mass transfer column (1) according to claim 1, wherein one tray section (7) on each side of said first separating weir (4) being defined by said first separating weir (4), said at least one guide weir (5), and said at least one braking weir (6), the first separating weir, at least one guide weir, and said at least one braking weir being interconnected.

3. A mass transfer column (1) according to claim 1, wherein said at least one guide weir (5) and said at least one braking weir (6) are positioned above the surface of said at least one transfer tray so that liquid can flow there under, and/or said at least one guide weir (5) and said at least one braking weir (6) have segments (8, 9) that are at least partially permeable to liquid.

4. A mass transfer column according to claim 1, further comprising a liquid level on said at least one transfer tray, wherein between each of said riser necks (10) and the corresponding riser cap (11) a gas outlet slot (12) is formed by a gap between the lower edge of the riser cap (11) and the surface of the transfer tray (2), each of the gas outlet slots being dimensional such that the gas outlet slot is beneath said liquid level even when the mass transfer column (1) is tilted relative to the vertical.

5. A mass transfer column according to claim 1, wherein between each of said riser necks (10) and the corresponding riser cap (11) a gas outlet slot (12) is formed by a gap between the lower edge of the riser cap (11) and the surface of the transfer tray (2), each of the gas outlet slots being positioned at a height above the surface of said at least one transfer tray which is lower than the bottom edge of said at least one guide weir (5) and/or said at least one braking weir (6).

6. A mass transfer column (1) according to claim 1, further comprising an entry weir (15) positioned at said liquid inlet and/or exit weir (16) positioned at said liquid outlet having sections (8, 9) that are at least partially permeable to liquid.

7. A mass transfer column (1) according to claim 4, wherein the mass transfer column is located on an offshore floating carrier system.

8. A mass transfer column according to claim 7, wherein said offshore floating carrier system is a ship and wherein said at least one separating weir (4) is aligned along the longitudinal axis of said ship.

9. A mass transfer column according to claim 1, wherein said first separating weir (4) changes the flow direction of liquid flowing over said at least one transfer tray by 180°.

10. A mass transfer column (1) according to claim 3, wherein said at least one guide weir (5) and said at least one braking weir (6) are positioned above the surface of said at least one transfer tray so that liquid can flow there under.

11. A mass transfer column (1) according to claim 3, wherein said at least one guide weir (5) and said at least one braking weir (6) have segments (8, 9) that are at least partially permeable to liquid.

12. A mass transfer column (1) according to claim 1, wherein said at least one transfer tray (2) has a plurality of braking weirs (6).

13. A mass transfer column (1) according to claim 1, wherein said at least one transfer tray (2) has a plurality of guide weirs (5).

14. A mass transfer column according to claim 4, wherein each gas outlet slot (12) is positioned at a height above the surface of said at least one transfer tray which is lower than the bottom edge of said at least one guide weir (5) and/or said at least one braking weir (6).

15. A mass transfer column (1) according to claim 1, wherein said at least one guide weir (5) and said at least one braking weir (6) are positioned above the surface of said at least one transfer tray so that liquid can flow there under, and/or said at least one guide weir (5) and said at least one braking weir (6) have segments (8, 9) that are at least partially permeable to liquid, and said column further comprising a liquid level on said at least one transfer tray, wherein between each of said riser necks (10) and the corresponding riser cap (11) a gas outlet slot (12) is formed by a gap between the lower edge of the riser cap (11) and the surface of the transfer tray (2), each of the gas outlet slots being dimensional such that the gas outlet slot is beneath said liquid level.

16. A mass transfer column (1) according to claim 1, wherein said first separating weir (4) changes the flow direction of liquid flowing over said at least one transfer tray by 180°, said at least one transfer tray (2) has a plurality of braking weirs (6), and said at least one transfer tray (2) has a plurality of guide weirs (5).

17. A mass transfer column according to claim 14, wherein said first separating weir (4) changes the flow direction of liquid flowing over said at least one transfer tray by 180°, said at least one transfer tray (2) has a plurality of braking weirs (6), and said at least one transfer tray (2) has a plurality of guide weirs (5).

18. A mass transfer column according to claim 15, wherein said first separating weir (4) changes the flow direction of liquid flowing over said at least one transfer tray by 180°, said at least one transfer tray (2) has a plurality of braking weirs (6), and said at least one transfer tray (2) has a plurality of guide weirs (5).

* * * * *